Aug. 27, 1929.  A. O. AUSTIN  1,726,097
INSULATOR BUSHING
Filed Aug. 11, 1924

INVENTOR
Arthur O. Austin
BY Nissen & Crane
ATTORNEY

Patented Aug. 27, 1929.

1,726,097

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR BUSHING.

Application filed August 11, 1924. Serial No. 731,504.

This invention relates to insulator bushings for high potential conductors and has for its object the provision of such a device which shall be of improved construction and operation and in which an internal member such as a static screen or a dielectric baffle may be supported from one member of the bushing.

The invention is exemplified in the combination and arrangement of parts shown in the accompanying drawings and described in the following specification and it is more particularly pointed out in the appended claims.

In the drawings—

In bushings of the oil or compound filled type, it is desirable to make the parts so that a tight joint may be obtained between the two dielectric members which enclose the system of baffles and hold the oil or compound. It is also an advantage to have the parts so made that the surfaces may be readily turned and the electrostatic screen or baffle system may be held in place through clamping to one of the main members forming the shell.

Figure 1:
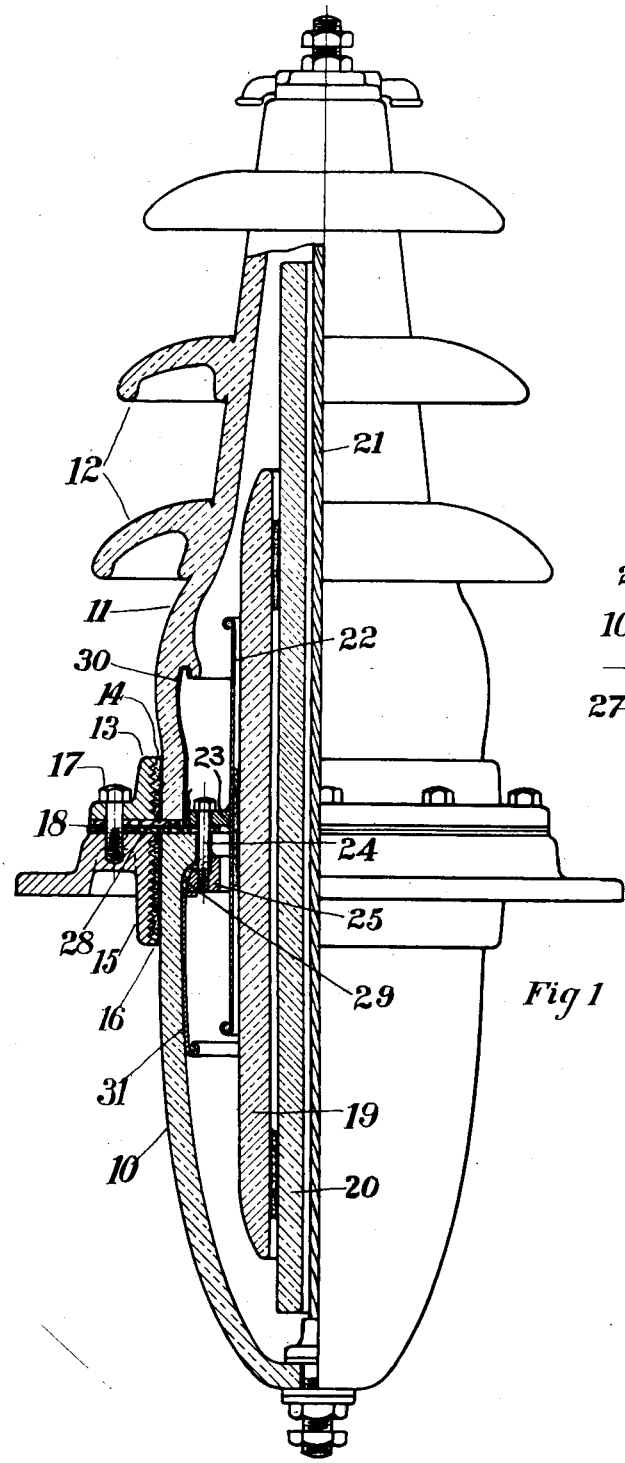
Fig. 1 is an elevation with parts in section showing one embodiment of the present invention.
Figure 2:
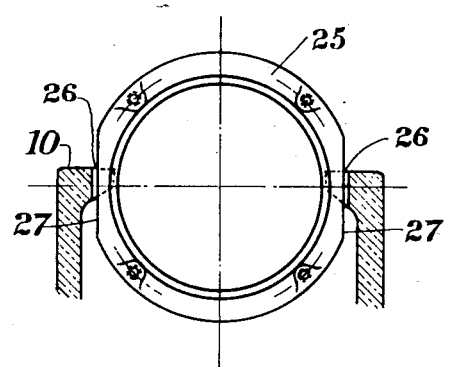
Fig. 2 is a somewhat diagrammatic sectional view, showing a step employed in assembling the parts.

One method of accomplishing this result is shown in Fig. 1. In Fig. 1, the bushing is composed of two members 10 and 11 forming an outer shell. The member 11 has weather sheds or projecting flanges 12 to increase the length of leakage path or to provide a higher flash-over voltage, particularly exposed to the weather. It is evident that the bushing may have both parts similar to 10 and 11 depending upon the results desired. The dielectric member 11 is provided with a metal flange 13 attached by cement or other suitable material in the joint 14. In similar manner the flange 15 is attached to the dielectric member 10 by cement or other suitable material, which forms a joint 16. The two systems of shells are clamped together by bolts 17 which cause the two parts to press upon a gasket 18. In the device shown the dielectric members 10 and 11 have flat bearing surfaces which are readily formed on a surface table or by grinding. Where the dielectric baffles 19 and 20 can be supported at the center portion of the bushing, a flexible conductor 21 may be used to provide for the greater expansion and contraction of the conductor as compared to the dielectric shell. The electrostatic screen 22 is provided with a flange 23 which rests on the gasket 18, placed between it and the lower dielectric member 10. The lower dielectric member 10 has a contracted internal diameter near the upper bearing surface and grooves are cut in this projection to permit the location of the clamping bolts 24, the bolts 24 being placed through the flange 23 and threaded into a complementary ring 25. The method of inserting the ring 25 is more clearly shown in Fig. 2. The ring 25 is turned on edge and dropped through the slots 26 which may later be used for the clamping bolts. Clamping ring 25 may have flattened surfaces 27 so that the slots 26 need not be very deep and there will be provided a considerable bearing surface between the ring 25 and the face of the dielectric member 10. After the complementary clamping ring 25 is passed down through the slots, it is rotated so that its plane is at right angles to the axis of the bushing. The gasket 18 is then put in place and the baffle system together with the electrostatic screen 22 is lowered into position. The bolts 24 are then put in position and the whole system clamped firmly to the dielectric member 10. Cords or wires may be looped about the ring 25 to hold it in position while the bolts 24 are being started in the threaded openings in the ring 25, the cords being withdrawn before the bolts are tightened. The necessity of this expedient may be avoided by assembling the ring in the member 10 while the member 10 is supported in an inverted position. Electrical contact is made between the electrostatic screen through a metallic conductor or dam 28. The gasket or cushioning material 29 is preferably placed between the ring 25 and the dielectric member 10 so as to distribute the load.

With this construction there is likely to be considerable space between the electrostatic screen and the outer dielectric members so that the screening effect is diminished or discharges tending to start from the edges of the flanges 13 and 15 will be greater than where the screen is closer. To obviate this difficulty, another screen may be placed near or in contact with the other wall. One of these is shown at 30. This screen may consist of any suitable conducting material in the form of spun metal or a casting, or may be a surface which is electroplated or coated with a conducting metal. A similar screen or shield 31 is shown for the lower member. These shields or screens are in contact with the central system.

I claim:—

1. An insulator comprising a pair of dielectric shell members, means for clamping said shell members to one another to form a closed casing and means integral with one of said shell members and projecting into said casing adjacent the portion thereof engaging the other shell member and forming a shelf extending into said casing beyond the adjacent portion of the other shell member for supporting other parts within said casing.

2. An insulator bushing comprising a pair of dielectric shell members, means for clamping said shell members together to form a closed casing, an internal projection on one of said shell members and a baffle within said casing supported by said projection.

3. An insulator bushing comprising a pair of shell members having open ends arranged to register with one another, means for clamping said shell members together to form a closed casing an inwardly extending projection integral with one of said shell members and extending into said casing beyond the adjacent portion of the other of said shell members to form an internal shelf and an electrostatic screen within said casing supported on said projection.

4. An insulator bushing comprising a pair of complementary shells, means for clamping said shells together to form a closed casing, an inwardly extending projection on one of said shells and a flux screen and a dielectric baffle within said casing supported on said projection, said screen and baffle being secured together to permit one to be supported by the other.

5. An insulator bushing comprising a pair of complementary dielectric shells, means for clamping said shells together to form a closed casing, an inwardly projecting circumferential flange on one of said shells and a clamping ring for co-operating with said flange to provide supporting connection for parts within said casing.

6. An insulator bushing comprising a pair of dielectric complementary shells, means for clamping said shells together to form a closed casing, an inwardly projecting circumferential flange integrally formed on the lower one of said shells adjacent the upper portion thereof and means resting on said flange for supporting parts within said casing.

7. An insulator bushing comprising an upper dielectric shell, a lower shell having an open end arranged to register with the open end of said upper shell, means for clamping said shells together to form a closed casing, said lower shell having an inwardly projecting integrally formed circumferential flange at its upper edge forming a shoulder within said casing and means resting on said shoulder for supporting parts within said casing.

8. An insulator comprising an upper and a lower dielectric shell, means for clamping said shells together to form a casing, an inwardly extending circumferential flange formed at the upper edge of said lower shell, a baffle within said casing and means for supporting said baffle on said flange.

9. An insulator bushing comprising a pair of complementary dielectric shells having registering portions, an inwardly projecting circumferential flange on one of said shells adjacent to the registering portion thereof, a cylindrical flux screen mounted on said flange within said casing and a dielectric baffle carried by said screen.

10. An insulator bushing comprising a pair of complementary dielectric shells arranged to register with one another to form a closed casing, one of said shells having an inwardly projecting flange thereon, attaching members arranged on opposite sides of said flange, means for clamping said attaching members to said flange and a baffle within said casing supported by one of said attaching members.

11. An insulator bushing comprising a pair of complementary dielectric shells, means for securing said shells together to form a closed casing, a flange projecting inwardly from one of said shells, attaching members disposed on each side of said flange, means for clamping said attaching members to said flange, a flux screen within said casing supported by one of said attaching members and a baffle carried by said flux screen.

12. An insulator comprising a hollow dielectric member having an inwardly projecting flange, and an attaching ring arranged to engage the inner face of said flange, said flange having a notch therein to permit said ring to pass into the interior of said dielectric member when disposed on edge.

13. An insulator comprising a hollow dielectric member having an inwardly projecting flange and an attaching ring arranged to be disposed within said member and to engage the inner face of said flange, said ring having a reduced diameter at one portion thereof, while said flange is provided with a cut away portion to permit the reduced diameter of said ring to pass into the interior of said dielectric member.

14. An insulator bushing comprising a pair of complementary dielectric shells, one of said shells having an inwardly projecting flange adjacent to the open end thereof, an attaching ring movable past said flange into the interior of said member and arranged to be disposed against the inner face of said flange, a supporting ring arranged to engage the outer face of said flange, means of clamping said ring against said flange and internal parts supported on said ring engaging the outer face of said flange.

15. An insulator bushing comprising a pair of complementary dielectric shells, one of said shells having an inwardly projecting flange thereon, a baffle supported within said bushing on said flange and a flux screen of conducting material disposed adjacent to the inner surface of said bushing.

16. An insulator bushing comprising a pair of complementary dielectric shells, a metallic flange secured to one of said shells, an integrally formed inwardly projecting flange on said shell, a baffle supported on said inwardly projecting flange, a flux screen of conducting material adjacent the inner surface of said shell and means for electrically connecting said flux screen with the flange secured to the outer surface of said shell.

17. An insulator bushing comprising a pair of complementary dielectric shells, means for clamping said shells together to form a closed casing, a flange projecting inwardly from one of said shells, clamping rings disposed on opposite sides of said flange, means for clamping said rings against said flange, a cylindrical flux screen carried by one of said rings and a dielectric bushing secured to the inner face of said flux screen.

18. An insulator bushing comprising a pair of complementary dielectric shells, metallic flanges secured to the outer faces of said shells adjacent the edges thereof, a gasket interposed between said edges, means for clamping said flanges together to cause said shells to form a closed casing with a tight joint therebetween, an inwardly projecting flange on one of said shells, a baffle supported by said inwardly projecting flange, a flux screen comprising a thin conductor member within said casing and means extending through the joint between said shells for forming electrical contact between said flux screen and said outer metallic flanges.

19. An insulator bushing comprising a pair of complementary dielectric shells having registering portions, metallic flanges secured to the outer faces of said shells, adjacent said registering portions, a yielding gasket interposed between said registering portions, an inwardly projecting flange on one of the said shells, a metal ring disposed within said shell adjacent to the inner side of said flange, a second metal ring resting on the outer side of said flange, means for clamping said rings to one another, a flux screen of thin metal carried by one of said rings, a baffle carried by said flux screen and comprising a pair of concentric dielectric cylinders secured to each other in spaced relation, a thin conductor screen disposed adjacent the inner surfaces of said shells at the sides thereof opposite said outer flanges and an electrical connection extending between the registering portions of said shells and connecting said flux screen and outer metallic flages.

In testimony whereof I have signed my name to this specification on this 4th day of August, A. D. 1924.

ARTHUR O. AUSTIN.